United States Patent  (10) Patent No.: US 8,275,414 B1
Athsani et al.  (45) Date of Patent: *Sep. 25, 2012

(54) USER AUGMENTED REALITY FOR CAMERA-ENABLED MOBILE DEVICES

(75) Inventors: Athellina R. Ahmad Athsani, San Jose, CA (US); Chris T. Kalaboukis, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/470,042

(22) Filed: May 11, 2012

Related U.S. Application Data

(63) Continuation of application No. 11/874,389, filed on Oct. 18, 2007, now Pat. No. 8,180,396.

(51) Int. Cl.
 *H04B 1/38* (2006.01)
(52) U.S. Cl. ............... 455/557; 455/566; 455/550.1; 455/456.2; 455/456.3; 455/418; 725/62; 725/81
(58) Field of Classification Search ............ 455/566, 455/556.1, 556.2, 457, 550.1, 418, 414.1, 455/456.3, 456.6, 456.2; 725/62, 81, 105; 348/14.01–14.07, 7–8
See application file for complete search history.

(56) References Cited

U.S. PATENT DOCUMENTS

| | | | |
|---|---|---|---|
| 6,037,936 A | 3/2000 | Ellenby et al. | |
| 6,292,158 B1 | 9/2001 | Amafuji et al. | |
| 6,512,919 B2 | 1/2003 | Ogasawara | |
| 6,629,097 B1 | 9/2003 | Keith | |
| 7,084,887 B1 | 8/2006 | Sato et al. | |
| 7,091,989 B2 | 8/2006 | Gibbs et al. | |
| 7,324,081 B2 * | 1/2008 | Friedrich et al. ........... 345/156 |
| 7,421,467 B2 | 9/2008 | Kaneko et al. | |
| 7,538,782 B2 | 5/2009 | Kuroki et al. | |
| 7,555,725 B2 | 6/2009 | Abramson et al. | |
| 7,690,990 B2 | 4/2010 | Van Luchene | |
| 2002/0075282 A1 | 6/2002 | Vetteril et al. | |
| 2003/0014212 A1 | 1/2003 | Ralston et al. | |
| 2003/0025714 A1 | 2/2003 | Ebersole et al. | |
| 2003/0065768 A1 | 4/2003 | Malik | |
| 2003/0095681 A1 | 5/2003 | Burg et al. | |
| 2006/0038833 A1 | 2/2006 | Mallinson et al. | |
| 2006/0104483 A1 | 5/2006 | Harel et al. | |
| 2006/0242129 A1 | 10/2006 | Libes et al. | |
| 2006/0293557 A1 | 12/2006 | Chuanggui et al. | |
| 2007/0015586 A1 | 1/2007 | Huston | |

(Continued)

OTHER PUBLICATIONS

Athsani et al., "User Augmented Reality for Camera-Enabled Mobile Devices," Yahoo! Inc., U.S. Appl. No. 11/874,389, filed Oct. 18, 2007.

(Continued)

*Primary Examiner* — Kathy Wang-Hurst
(74) *Attorney, Agent, or Firm* — Weaver Austin Villeneuve and Sampson LLP

(57) ABSTRACT

Apparatus and methods are described for providing a user augmented reality (UAR) service for a camera-enabled mobile device, so that a user of such mobile device can use the mobile device to obtain meta data regarding one or more images/video that are captured with such device. The meta data is interactive and allows the user to obtain additional information or specific types of information, such as information that will aid the user in making a decision regarding the identified objects or selectable action options that can be used to initiate actions with respect to the identified objects.

21 Claims, 9 Drawing Sheets

U.S. PATENT DOCUMENTS

| | | | |
|---|---|---|---|
| 2007/0106721 | A1 | 5/2007 | Schloter |
| 2007/0162942 | A1* | 7/2007 | Hamynen et al. ............. 725/105 |
| 2007/0164988 | A1* | 7/2007 | Ryu et al. ...................... 345/156 |
| 2007/0205963 | A1 | 9/2007 | Piccionelli et al. |
| 2007/0236514 | A1 | 10/2007 | Agusanto et al. |
| 2008/0018915 | A1 | 1/2008 | Moore |
| 2008/0071559 | A1* | 3/2008 | Arrasvuori ........................ 705/1 |
| 2009/0081959 | A1 | 3/2009 | Gyorfi et al. |
| 2009/0102859 | A1 | 4/2009 | Athsani et al. |
| 2009/0189974 | A1 | 7/2009 | Deering |
| 2009/0289955 | A1 | 11/2009 | Douris et al. |
| 2009/0289956 | A1 | 11/2009 | Douris et al. |

OTHER PUBLICATIONS

Douris et al., "Reality Overlay Device," Yahoo! Inc., U.S. Appl. No. 12/125,877, filed May 22, 2008.

Douris et al., "Virtual Billboards," Yahoo! Inc., U.S. Appl. No. 12/125,891, filed May 22, 2008.

MEDIASEEK releases "Camera Dictionary" the application that translates English words by simply scanning the mobile's camera over words. http://www.slashphone.com/64/51775.html, printed Oct. 4, 2007 (3 pages).

David Derbyshire, "Phones or iPod a thing of the past," http://www.dailymail.co.uk/pages/live/articles/news/news.html?in_article_id=533358&in_. . . printed Mar. 21, 2008 (pp. 3-11).

Future of Internet Search: Mobile version, http://petitinvention.wordpress.com/2008/02/10/future-of-interest-search-mobile-version/ printed Mar. 21, 2008 (pp. 1-19).

Google Mobile—SMS http://www.google.com/intl/en_us/mobile/default/sms.html, printed Feb. 4, 2009 (2 pages).

Yahoo! Babel Fish—Text Translation and Web Page Translation, http://babelfish.yahoo.com/, printed Feb. 4, 2009.

Attributor: Overview—Monitor your content and improve your content syndication, http://www.attributor.com/how_it_works/overview.php, printed Feb. 4, 2009 (12 pages).

Google, Neven Vision & Image Recognition, Search Engine Journal, http://www.searchenginejournal.com/google-neven-vision-image-recognition/3728/#more-3728, printed Feb. 4, 2009.

Downloads—pgp.comFree PGP Encryption Platform Evaluation—Download PGP Univers . . . http://www.pgp.com/downloads/destoptrial/index.html printed Feb. 4, 2009 (1 page).

PGP Whole Disk Encryption—Comprehensive Hard Drive Encryption for PC's, Laptops and . . . http://www.pgp.com/products/wholediskencryption/index.html, printed Feb. 4, 2009, (2 pages).

Callas J., et al. Open PGP Message Format; http://www.ietf.org/rfc/rfc2440.txt, Request for Comments 2440, International Engineering Task Force, Nov. 1998.

Non-Final Office Action dated Sep. 29, 2011, from U.S. Appl. No. 11/874,389.

Notice of Allowance dated Jan. 19, 2012, from U.S. Appl. No. 11/874,389.

Supplemental Notice of Allowance dated Feb. 27, 2012, from U.S. Appl. No. 11/874,389.

Non-Final Office Action dated Dec. 28, 2010, from U.S. Appl. No. 12/125,877.

Final Office Action dated Jun. 1, 2011, from U.S. Appl. No. 12/125,877.

Non-Final Office Action dated Dec. 29, 2010, from U.S. Appl. No. 12/125,891.

Final Office Action dated Jun. 14, 2011, from U.S. Appl. No. 12/125,891.

Non-Final Office Action dated May 4, 2012, from U.S. Appl. No. 12/125,891.

* cited by examiner

USER AUGMENTED REALITY FOR CAMERA-ENABLED MOBILE DEVICES

RELATED APPLICATION DATA

The present application is a continuation of and claims priority under 35 U.S.C. 120 to U.S. patent application Ser. No. 11/874,389 for User Augmented Reality for Camera-Enabled Mobile Devices filed on Oct. 18, 2007, the entire disclosure of which is incorporated herein by reference for all purposes.

BACKGROUND OF THE INVENTION

The field of the present invention relates generally to mobile devices. More particularly, it relates to use of a camera of a mobile device to provide useful information regarding captured images.

The use of mobile devices, such as cellular phones or personal digital assistant (PDA) devices, has increased dramatically in the last decade. Often, such mobile devices include a camera and display for displaying images at which the camera is pointed. Since people usually carry their camera-capable mobile devices with them to a number of settings, it would be beneficial to provide additional mobile applications for utilizing the camera and display capabilities of such prevalent mobile devices.

SUMMARY OF THE INVENTION

In embodiments of the present invention, a user augmented reality (UAR) service is provided for a camera-enabled mobile device so that a user of such mobile device can use the mobile device to obtain meta data regarding one or more images/video that are captured with such device. As the user points the mobile device's camera at one or more objects in one or more scenes, such objects are automatically analyzed by the UAR to identify the one or more objects and then provide meta data regarding the identified objects in the display of the mobile device. The meta data is interactive and allows the user to obtain additional information or specific types of information, such as information that will aid the user in making a decision regarding the identified objects or selectable action options that can be used to initiate actions with respect to the identified objects. The user can utilize the UAR to continuously pass the camera over additional objects and scenes so that the meta data presented in the display of the mobile device is continuously updated.

In one embodiment, a method of providing information regarding one or more scenes captured with a camera of a mobile device is disclosed. When a camera of the mobile device is pointed at a scene having one or more object(s), an image or video of the scene is presented in a display of the mobile device, and the image or video is overlaid with a plurality of options for selecting one of a plurality of user augmented reality modes that include an encyclopedia mode, a decision support mode, and an action mode. When the encyclopedia mode is selected, contextual information regarding an identity of the one or more objects is obtained and the obtained contextual information is presented in the display. When the decision support mode is selected, decision information related to a set of actions that can be taken with respect to an identity of the one or more object(s) is obtained and the decision information is presented in the display. When the action mode is selected, a set of references to a plurality of actions that can be performed with respect to an identity of the one or more object(s) is obtained and the set of references are presented in the display so that they are selectable by a user to initiate the referenced actions.

In a specific implementation, obtaining the contextual information, decision information, and set of references to actions is accomplished by sending the image/video to one or more servers and receiving a second image/video from the one or more servers whereby the second image/video includes the contextual information, decision information, or the set of references, respectively, and wherein presenting the contextual information, decision information, and set of references comprises presenting the received second image/video. In a further aspect, the second image/video further includes the captured scene so that the contextual information, decision information, or the set of references is overlaid on the captured scene. In another aspect, a location of the mobile device is sent to the one or more servers and the contextual information, decision information, and set of references are further based on the location of the mobile device. In yet a further aspect, the contextual information, decision information, and set of references are further based on a social network of a user associated with the mobile device.

In an alternative embodiment, the identity of the one or more objects includes an indication as to a direction in which the camera is pointed with respect to a physical location of such camera. In a specific implementation, the contextual information includes one or more of the following items: historical information regarding a place in the scene, historical information regarding a building in the scene, time period information regarding other businesses that were located at a place or in a building of the scene, weather information for a place in the scene, travel direction information for a place or building in the scene, one or more reviews, rating, or commentary for at least one object of the scene, a dress requirement of a restaurant or event of the scene, a menu from a restaurant in the scene, a price list for a business in the scene, hours of operation for a place in the scene, information regarding a person in the scene, a link to a personal web site of a person in the scene, contact information for a person in the scene, biographical information for a person in the scene, membership information for a person in the scene, or information regarding a direction of the scene with respect to a street or a transportation route in the scene.

In another specific embodiment, the decision information includes one or more of the following items: one or more reviews, rating, or commentary by a professional critic or friend in the user's social network for at least one object of the scene, a dress requirement of a restaurant of the scene, a menu from a restaurant in the scene, a price list for a business in the scene, hours of operation for a place in the scene, a count of people or friends of the user who have visited a place in the scene, or information regarding a specific type of place in the scene.

In another specific example, the actions include one or more of the following: communicating with a particular person via such other person's communication device, making reservations to visit a place in the scene, sending a video stream of one or more scene images/video captured with the user's mobile device such that the sent video stream may also include the contextual information or the decision information for such one or more scene images/video, or updating a personal information manager (PIM) of the user or another user.

In another embodiment, when a reference is selected by the user, the referenced action is initiated. In a further aspect, after the reference is selected by the user, the contextual and/or decision information is presented or additional contextual and/or decision information is obtained or presented.

In alternative embodiment, a method of providing information to a mobile device is disclosed. When one or more imaged scenes are received from a camera of a mobile device, an identification of the one or more objects of the one or more scenes is obtained. When an encyclopedia mode is selected for the one or more imaged scenes, contextual information regarding the identified one or more objects is obtained and the obtained contextual information is sent to the mobile device. When a decision support mode is selected for the one or more imaged scenes, decision information related to a set of actions that can be taken with respect to the identified one or more object(s) is obtained and the decision information sent to the mobile device. When an action mode is selected for the one or more scenes, a set of references to a plurality of actions that can be performed with respect to the identified one or more object(s) is obtained and the set of references is sent to the mobile device. The references are selectable by a user to initiate the referenced actions. In a specific implementation, the contextual information and the decision information are obtained by performing a search for the identified objects and the actions correspond to a type of identified object. In another embodiment, the decision support mode is automatically selected when a person in an image/video scene is identified as a criminal, wherein the decision information indicates the presence of a criminal at a location of the user, and the action mode is automatically selected when a person in an image/video scene is identified as a criminal, wherein the actions include alerting the police regarding the identified criminal. In all instances and modes, the user may have the option of adding their own content to the system, i.e. User Generated Content. The content that a user can add may include, but is not limited to, text, images, videos, references, urls and documents.

In another embodiment, the invention pertains to a mobile device having a camera for capturing images or videos and a display for displaying the captured images/video. The mobile device further includes processor and a memory that is configured to perform one or more of the above described operations. In another embodiment, the invention pertains to a system having a processor and memory that are configured to perform one or more of the above described operations. In another embodiment, the invention pertains to at least one computer readable storage medium having computer program instructions stored thereon that are arranged to perform one or more of the above described operations.

These and other features will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

When people are traveling, they may not know where to go or what to do, especially with respect to unfamiliar places, people, or objects that they may encounter during their travels. A traveler may utilize a paper guide book, or an electronic guide, such as a web enabled device, for obtaining information regarding particular places that they may see during their travels. However, these guides may be awkward to use or possibly unavailable to the person at the moment the traveler needs it. In general, embodiments of the invention provide a User Augmented Reality (UAR) service for use with a camera enabled mobile device by a user in order to gain meta data or decision support information based on visual input received by the camera of such device. The obtained information may then be presented to the user on the mobile device, for example, via the display or an audio output.

Figure 1:
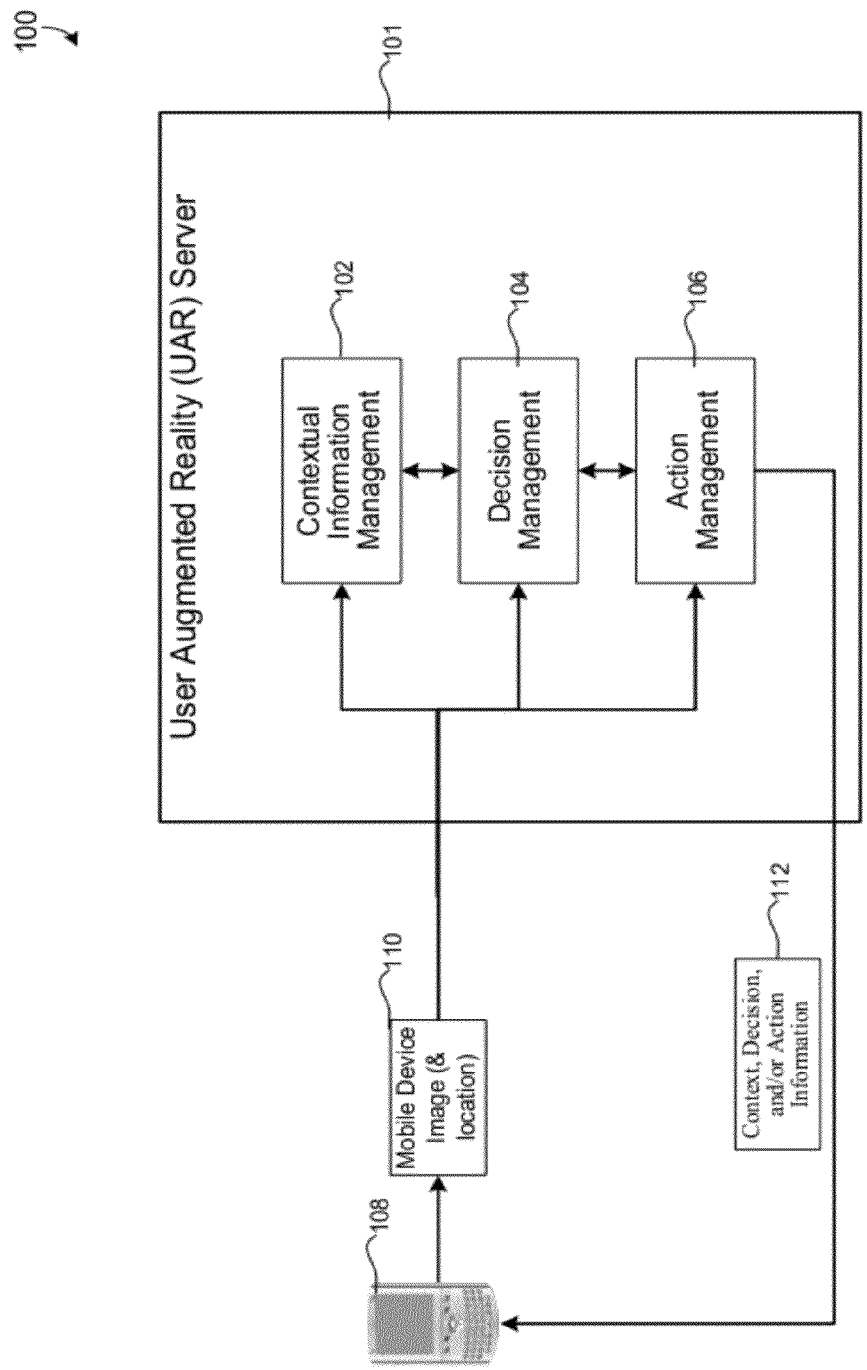
FIG. 1 is a diagrammatic representation of an example implementation of the present invention.

FIG. 1 is a diagrammatic representation of an example implementation 100 of the present invention. As shown, a mobile device 108 may be operable to capture and send a mobile device image/video 110, and possibly a location, to a User Augmented Reality (UAR) server 101. Multiple mobile device images/video 110 (and location data) may continuously be sent to the UAR server 101 as a video stream (and data stream). Each mobile device image/video 110 generally contains a scene at which the mobile device's camera is pointed, and such scene can contain one or more objects. An object in an image/video scene is generally defined as anything that can be visually perceived. Examples of objects include people, places, physical items, directional indications (e.g., when the camera is pointed towards an eastbound direction of a train track), live objects such as animals or plants, locality (e.g., exact coordinates of where the user currently is in reference to a source point or otherwise), etc. Objects can be any person, place or thing, and other examples include statues in a museum, a painting in an art gallery, a person standing at a buffet table, a café, an intersection, a train station, a tree, or a sign. Any person, place, or thing which can be recognized by the device can be used as input to the image recognition software.

The UAR server 101 may include any suitable modules for providing information regarding one or more objects in a received image/video 110. As shown, the UAR server 101 includes a contextual information management module 102, a decision management module 104, and an action management module 106, which operate to return contextual, decision support, and/or action information 112, respectively, to the mobile device 108 for displaying on such mobile device.

Contextual information generally includes any information (or links or references to such information) regarding one or more objects in one or more received image/video scenes. The contextual information may be in the form of a textual, visual, or auditory description or may take the form of a web link or reference to such information. Examples of contextual information include historical information regarding a particular place (e.g., information regarding a particular building, dates of various establishments that have existed in such location, local weather information, historical events, prior embodiments of the location (e.g., the building used to be a warehouse), historical real estate prices and past agents/owners, online encyclopedia entries or dictionary entries regarding the received scene image/video), current information regarding a particular place (e.g., directions, ratings, dress requirements, menus, prices, contact information, hours for opening and closing of a particular place, owner's/place affiliations (political, ethnic, financial etc) or person (e.g., information from the person's personal web page, contact information, biographical information, calendar or other PIM or personal information manager information, other social data etc.) in the received scene image/video, or information regarding the direction in which the camera is pointed (e.g., scheduling information regarding a specific train (or other mode of transportation) track direction, information regarding businesses in a specific street direction, altitude, longitude, typical weather patterns for that time of the year, barometer, GMT-related information or any other spatial or temporal data, etc). In another informational example, if the user goes to an ethnic restaurant and is currently unsure how to eat the prepared meal, the user can point her mobile device to the meal and have the application return an instructional video on how to eat the meal.

Decision support information generally includes any information that may help a user of the mobile device take specific actions with respect to one or more objects in one or more received image/video scenes. The decision support information may be in the form of a textual, visual, or auditory description or may take the form of a web link or reference to such information. Decision support information may include ratings, review, or commentary regarding a particular place so a user can determine whether to go to such place. Ratings, reviews, and comments may be performed by the user, professional critics or by friends in the particular user's social network. The decision support information may also indicate a count or a listing of people within the user's social network who have recently visited a particular place. So as to aid in a decision of whether to travel to a particular place, the decision support material may be tailored to the particular type of place. For instance, if the place is a restaurant, the decision support material may include a menu, prices of food, dress code requirements, reservations availability etc. If the place is a golf course, the decision support material may include the type of clubs or balls to use, whether to rent a cart, which caddy to pick, which member might be available to play with the user, ratings, reviews, menu, political affiliation of the owner, eco-friendly, etc. Information may be also tailored to the user. For example, if the user of the device is concerned about the environment, the decision support information which is presented can be prioritized based on the user's preference for being more interested in that data—e.g., use of green packaging etc.

Action information generally provides recommendations to a user for performing actions with respect to one or more objects in one or more received scene images/video. The actions may include receiving instructional videos, images, text instructions on the next actionable item based on the user's captured images/videos/information, communicating with a particular person, e.g., via such person's UAR enabled mobile device, making reservations to visit a place, sending a video stream of one or more scene images/video captured with the user's mobile device and the sent video stream may also include contextual, decision support, or action information for such one or more scene images/video, updating a personal information manager (PIM), such as a calendar or contact book, for the user and/or one or more friends of the user, ordering takeout, book marking an image/video or web site for an object for later use, adding information to an address book, tagging an object, adding to a favorite restaurant list, etc.

A user may switch between the different modes and have the corresponding information presented on her mobile device. In a specific application of the present invention, a user named Juanita encounters a restaurant in her old home town. She thought that there was a different store located at the encountered restaurant's site. She activates the camera of her UAR enabled mobile device, holds up her mobile device in front of the restaurant, and selects the encyclopedia mode. The mobile device then presents web links to the restaurant's information, which includes historical information about the building, indicating that the restaurant is new and that a café used to be housed in this building. Juanita now realizes that the restaurant opened since she was last in town.

Juanita then wonders whether she would like to go to this restaurant so she switches to decision support mode. In decision support mode, her mobile device now displays ratings, reviews, and comments on the restaurant, menu and price lists, and other data which would aid her in deciding if she would like to eat there. The decision support information includes a recent review by a good friend of hers. She decides that she wants to go to this restaurant, but would like to take another friend (Marco) later tonight.

Juanita the switches to action mode and her mobile device then gives her a selectable option to connect to her friend Marco's UAR enabled mobile device, send a live video stream from Juanita's mobile device to another mobile device, and make a reservation. She chooses to connect with her friend Marco and then communicates her request to Marco to join her tonight at the restaurant at 8:00 pm. Juanita also chooses to send a live video stream from her mobile device to Marco's mobile device so that Marco can view the meta data that has been obtained for the restaurant. Marco reviews the ratings and other information and he notices that the data indicates the dress code. In this case, the UAR has access to Juanita and Marco's wardrobe inventory and can also recommend an outfit based on the dress code. Marco agrees to meet Juanita. However, since Marco is not properly dressed, he suggests a 9:00 pm reservation in order for him to have enough time to change. Juanita makes a reservation by selecting the reservation option. The UAR makes the requested reservation for 9:00 pm and may also update Juanita's and Marco's calendar information. The UAR can also realize that the weather is cold at 9:00 pm in the location of the restaurant and recommend a coat to both Juanita and Marco via their mobile devices.

Although the modes are described as being separately selectable herein, the UAR can be configured to intelligently switch between the different modes without any effort by the user. For instance, the user can first be presented with information from an encyclopedia mode and then based on the user's selections of information be presented with information from a decision support mode. After the user is given a time period for reviewing the decision support information, the UAR may then switch to action mode. The user may also be presented with additional decision support material as she chooses various actions. The UAR may also select different modes based on at what the camera is pointed. Alternatively, the UAR may even start in the user's preferred mode based on personal style. If the user is action oriented, then he can set the device to start in action mode. If the user prefers to have the decision support first, then he can ask for the action mode to be displayed first. Also, certain modes can be locked out—for example a parent may allow encyclopedic mode only and give the device to a child to use, so that the child can use it to look at objects and receive the encyclopedic data only.

Figure 2:
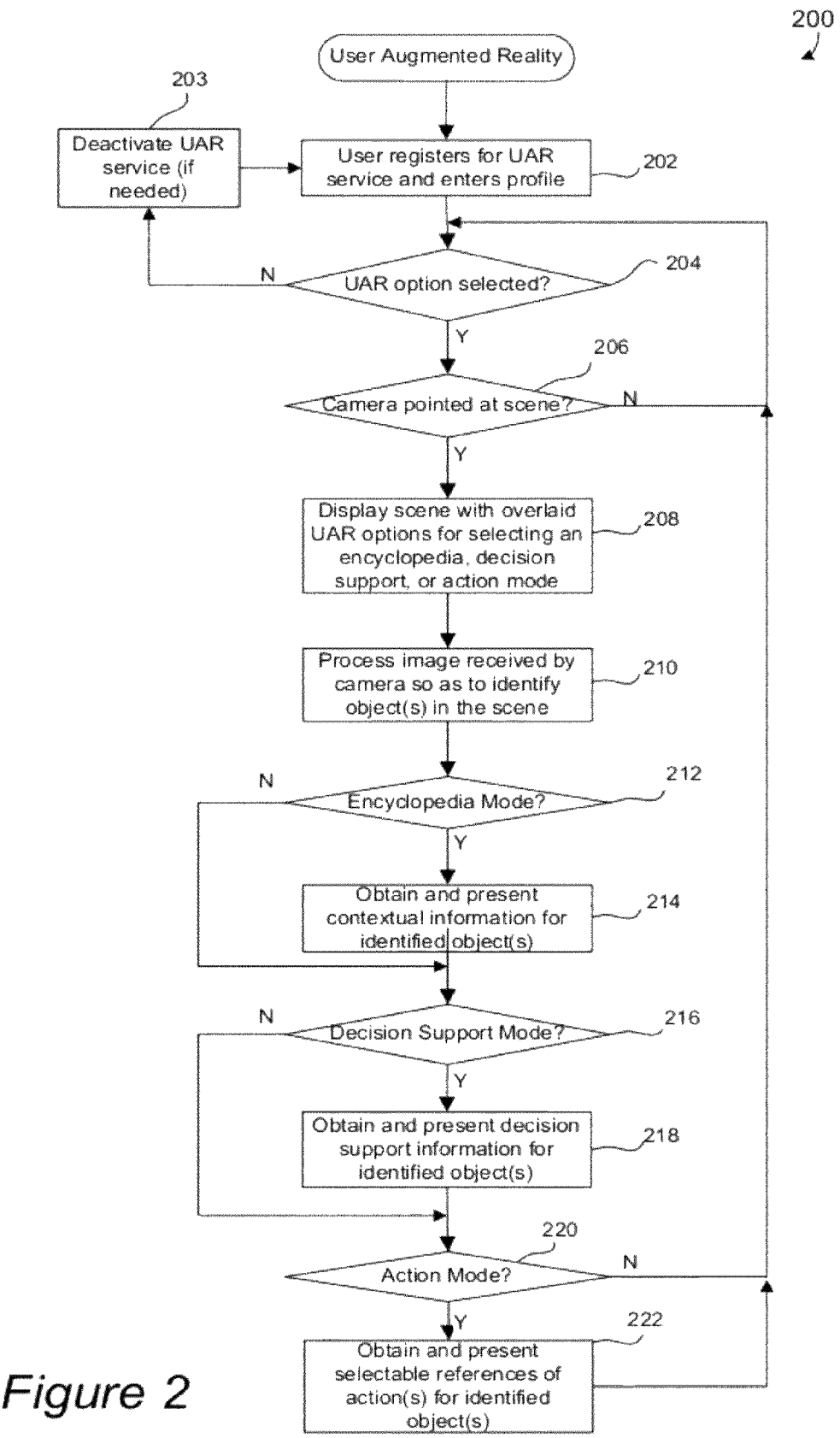
FIG. 2 is a flowchart illustrating a procedure for providing a User Augmented Reality (UAR) service in accordance with one embodiment of the present invention.

FIG. 2 is a flowchart illustrating a procedure 200 for providing a User Augmented Reality (UAR) service in accordance with one embodiment of the present invention. The UAR procedure 200 of FIG. 2 is described below with respect to a single user on a single mobile phone. Of course, this UAR procedure may be implemented with respect to any number of mobile devices and users in a diverse cellular and/or computer network as described further below. Initially, a user may register for a UAR service and enter profile information in operation 202. In the illustrated embodiment, the user registers for the UAR service although such registration is not required in other embodiments. By way of example, a user may register at a UAR web site and enter user information, such as a username and password, as well as information regarding a social network. The profile information that is entered by a user may be recorded in one or more databases. Profile information may also be entered by a user via another type of service or application, and such profile information may be accessible by the UAR, e.g., if the UAR and profile information are provided by communicating servers, such as Yahoo! servers for implementing various Yahoo! applications and services for users available from Yahoo! Inc. of Sunnyvale, Calif.

Figure 7A:
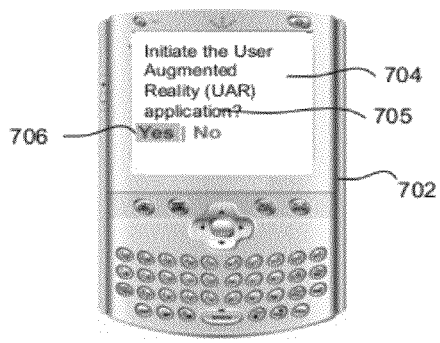
FIG. 7A shows a mobile device in the form of a PDA upon which a UAR option is displayed in accordance with one embodiment of the present invention.

It may then be determined whether a UAR option has been selected in operation 204. A UAR process may be triggered in any number of ways. The user may choose to turn on the UAR mobile application on her mobile device. The UAR option may be automatically presented to the user in the display of the mobile device after the user turns the mobile device on or after the user is viewing an image/video in the mobile devices camera. The user can also select the UAR option at any time as a selectable mobile application. FIG. 7A shows a mobile device 702 in the form of a PDA upon which a UAR option 705 is presented in display 704 in accordance with one embodiment of the present invention. A user may select the UAR option 705, for example, by hitting a "yes" button 706. A user may also enter profile information at this point.

Figure 7B:
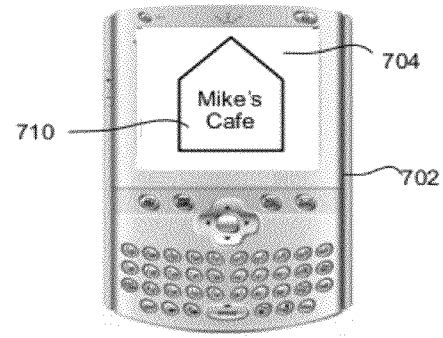
FIG. 7B illustrates the mobile device of FIG. 7A with the camera activated so that an image/video is captured in accordance with one embodiment of the present invention.

Referring back to FIG. 2, the UAR procedure 200 may continue to wait for selection of the UAR option by the user of the mobile device in operation 204. After the UAR option is selected, it may then be determined whether the camera of the mobile device is pointed at a scene in operation 206. For example, it may simply be determined whether the mobile device's camera function has been activated. FIG. 7B illustrates the mobile device 702 of FIG. 7A with the camera activated so that an image/video 710 is captured in accordance with one embodiment of the present invention. More specifically, an image/video of a restaurant (i.e., Mike's Café) 710 is captured in the display 704. If the camera is not pointed at a scene, the procedure 200 may again check whether the UAR option has been selected, e.g., whether the option has been turned off. For instance, the user may have turned off the translation function on her mobile device to take a normal photograph or video or utilize some other mobile application, besides the UAR application. If the UAR option is turned off, the UAR service may also be deactivated if needed in operation 203.

Figure 7C:
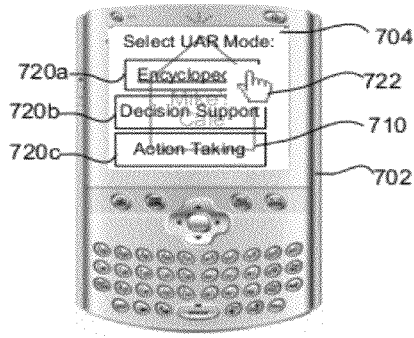
FIG. 7C illustrates the mobile device of FIG. 7A with a plurality of options for selecting an encyclopedia mode, a decision support mode, and an action mode in accordance with one embodiment of the present invention.

When the camera is pointed at a scene, such scene may be displayed with overlaid UAR options for selecting an encyclopedia, decision support, or action mode in operation 208. Alternatively, the UAR options may be presented so as to replace the original captured image/video. FIG. 7C illustrates the mobile device 702 with a plurality of options 720 for selecting an encyclopedia mode (e.g., option 720a), a decision support mode (e.g., option 720b), and an action mode (e.g., option 720c) in accordance with one embodiment of the present invention. As shown, these selectable options 720 are overlaid on the captured image/video 710. The user may use any suitable control mechanism of the mobile device to select one of these options. For instance, the user may move a cursor 722 to select one of the options, such as the encyclopedia mode option 720a, which is shown as selected in FIG. 7C.

The image or video that is received by the camera may then be processed so as to identify one or more objects in the scene in operation 210. Standard image analysis and object recognition techniques as describer further below may be utilized to identify one or more objects in a scene. In general, edges within the scene are detected and then line segments and circular arcs are then fit onto these edges to form object features. The object features are then matched against known object features, e.g., from one or more object feature databases. A known object feature has a known identity. The one or more object feature databases provide a training set for identifying unknown object features based on a best match between an unknown object feature and a known object feature.

Referring back to FIG. 2, it may also be determined whether an encyclopedia mode has been selected in operation 212. If an encyclopedia mode has been selected, contextual information for the identified objects may then be obtained and presented in operation 214. Otherwise, this operation is skipped. It may also be determined whether a decision support mode has been selected in operation 216. If a decision support mode has been selected, decision support information for the identified objects may then be obtained and presented in operation 218. Otherwise, this operation is skipped. It may then be determined whether an action mode has been selected in operation 220. If such mode has been selected, selectable references to actions for the identified objects may then be obtained and presented in operation 222. Otherwise this operation is skipped. The UAR procedure 200 may continue to check whether a UAR option has been selected and whether particular modes have been selected, e.g., by the user.

Figure 3:
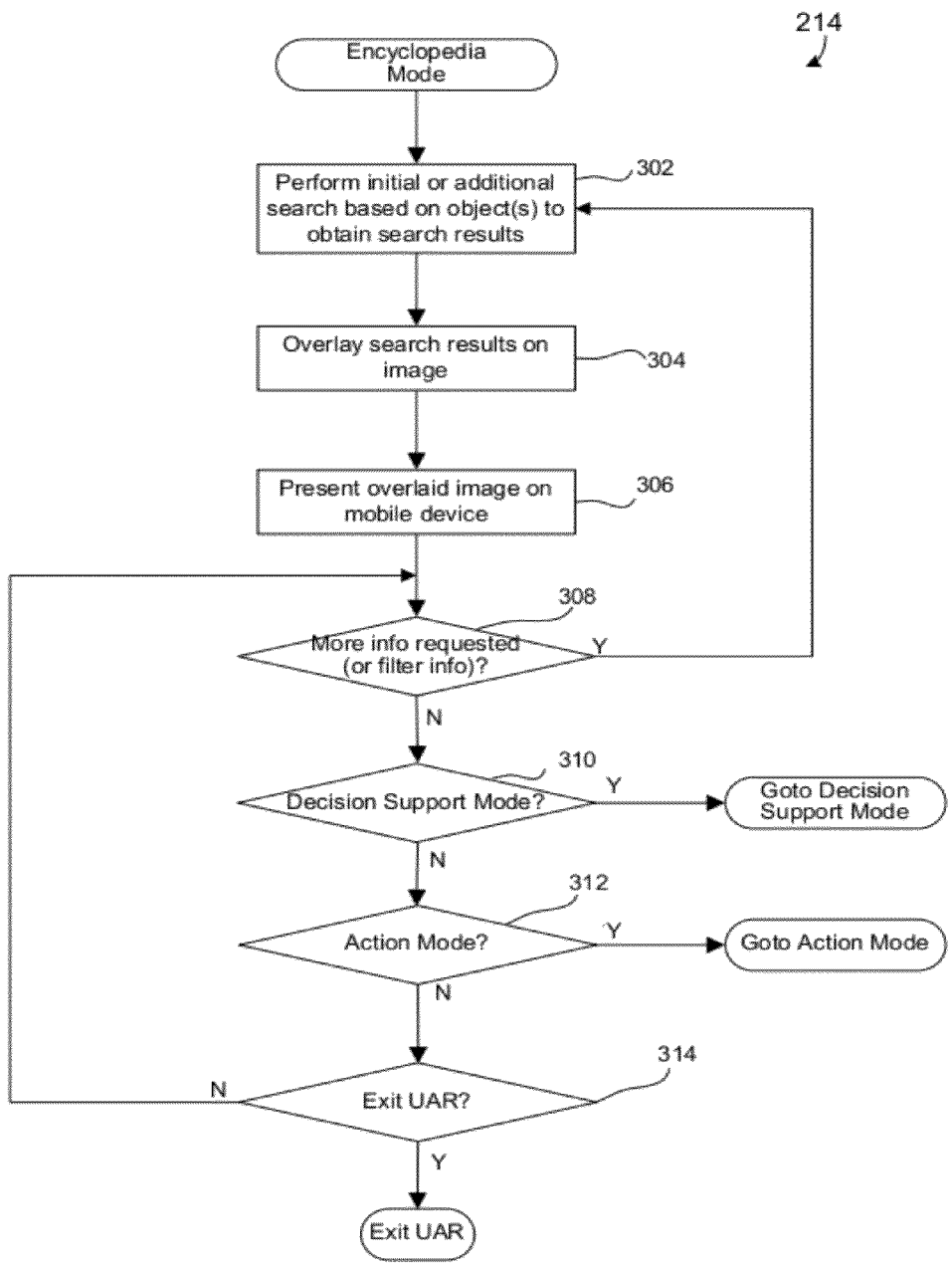
FIG. 3 is a flowchart illustrating the operation of FIG. 2 for performing an encyclopedia mode process in accordance with one implementation of the present invention.

FIG. 3 is a flowchart illustrating the operation 214 of FIG. 2 for performing an encyclopedia mode process in accordance with one implementation of the present invention. Initially, a search may be performed based on the identified objects to obtain search results in operation 302. For example, if a specific place is identified in the captured scene, a Yahoo! local search, available from Yahoo! of Sunnyvale, Calif., may be performed for the specific place so as to obtain information or links regarding the place as described above. Other types of search engines may also be utilized. The local weather may also be obtained from a weather web site, such as weather.com. If a person is identified in the scene, a search for the identified person may be performed on various personal web sites, such as Facebook.com (available from Facebook of Palo Alto, Calif.) or GeoCities.com, available from Yahoo! Inc. of Sunnyvale, Calif., so as to obtain personal information or links as described above. By way of another example, public membership lists for various establishments may be searched with respect to an identified person or place. Any public source may be searched for contextual information or links regarding a person or place. Additionally, the user may authorize the UAR to search any suitable private source, such as the user's private web site.

Figure 7D:
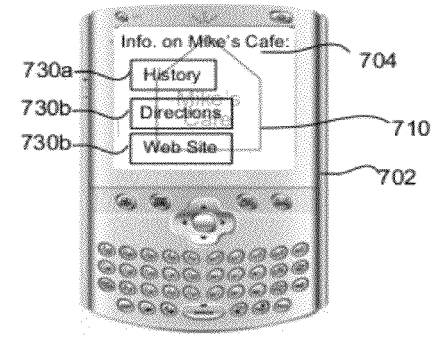
FIG. 7D illustrates contextual search results being overlaid over the original image/video in the display of mobile device of FIG. 7A in accordance with one embodiment of the present invention.

The obtained search results may then be overlaid on the image/video in operation 304. The overlaid image/video may then be presented on the mobile device in operation 306. Alternatively, the search results may replace the original captured image/video. FIG. 7D illustrates contextual search results 730 being overlaid over the original image/video 710 in the display 704 of mobile device 702 in accordance with one embodiment of the present invention. As shown, the overlaid contextual information includes a history web link 730a, a directions web link 730b, and a web site link 730c for the identified place Mike's Café.

Referring again to FIG. 3, it may then be determined whether more information has been requested in operation 308. For example, a user may select search filter options, such as the number or type (e.g., category) of search results. If more information has been requested, an additional search may be performed and resulting search results may be overlaid in an image/video that is returned to the mobile device in operations 302, 304, and 306. If the user selects filter criteria, the search may be performed or the search results refined based on such filter criteria.

If additional information has not been requested, it may then be determined whether the decision support mode has been selected in operation 310. If such mode has been selected, the procedure advances to a decision support mode process (e.g., FIG. 4). It may also be determined whether an action mode has been selected in operation 312. If an action mode has been selected, the procedure continues to an action mode process (e.g., FIG. 5). Otherwise, it may be determined whether the user has exited the UAR service in operation 314. For example, the user may chose to turn the UAR application off. If the UAR has been exited, the encyclopedia procedure 214 ends and the UAR service may be deactivated. Otherwise, the encyclopedia mode operation 214 may continue to repeat.

Figure 4:
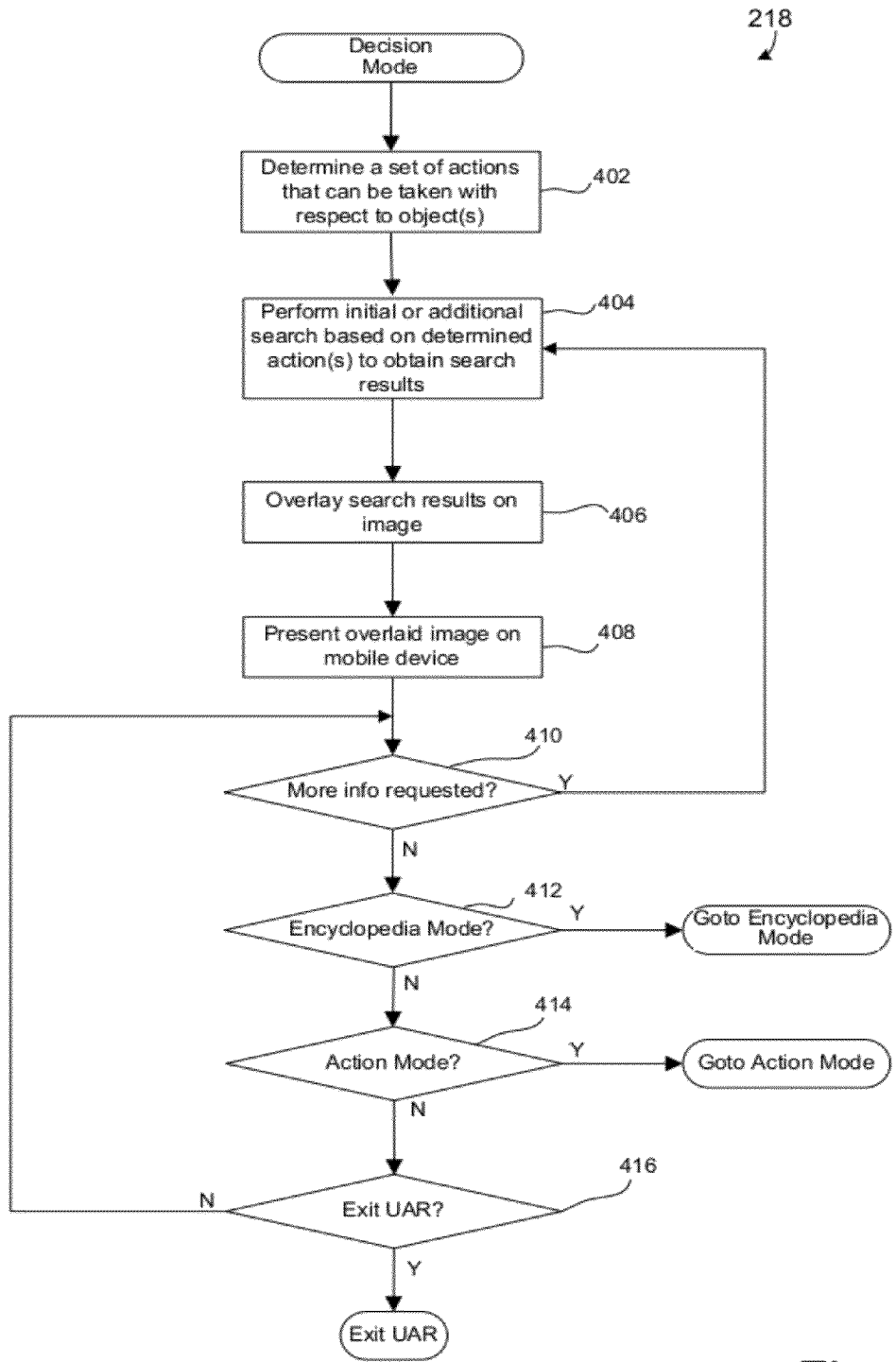
FIG. 4 is a flowchart illustrating the operation of FIG. 2 for performing a decision support mode in accordance with one embodiment of the present invention.

FIG. 4 is a flowchart illustrating the operation 218 of FIG. 2 for performing a decision support mode 218 in accordance with one embodiment of the present invention. Initially, a set of actions that can be taken with respect to the identified objects may be determined in operation 402. This identification may have already been performed with respect to selection of a previous mode, e.g., an action mode selection, and, accordingly, would then not have to be repeated for this decision support mode. A set of actions may be determined based on object type. For instance, a restaurant object may have an associated reservation action. Certain actions may apply to all object types. For example, an action for communicating with a friend or sending a live video stream to a friend may be applicable to all object types. An initial search may then be performed on the determined actions to obtain search results in operation 404. For example, reviews and ratings may be found for a reservation action so as help the user decide whether to make a reservation. Other types of actions may not require a search.

It may also be determined that the user is pointing his camera in a particular direction with respect to a place, and relevant information is then presented to such user. For instance, the user may point his camera at a specific train station and then later point their camera down a specific train track in a specific direction. The schedule for a train that is traveling on the specific track in the specific direction may then be presented to the user.

Figure 7E:
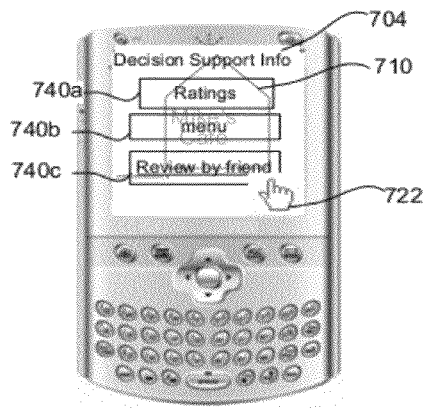
FIG. 7E illustrates decision support links for Mike's café that are overlaid over the captured image/video in the display of the mobile device of FIG. 7A in accordance with one embodiment of the present invention.

The search results (and information regarding non-searched actions) may then be overlaid on the image/video in operation 406. The overlaid image/video may then be presented on the mobile device in operation 408. Alternatively, the search results may replace the original image/video in the mobile device. FIG. 7E illustrates decision support links for Mike's café that are overlaid over the captured image/video 710 in accordance with one embodiment of the present invention. As shown, a ratings link 740a, a menu link 740b, and a "review by a friend" link 740c of User A are presented in display 704. The User A selects the "review by a friend" link 740c via cursor 722, and the review is then displayed for User A (not shown). Other decision support links or information may also or alternatively be presented as described above.

Referring again to FIG. 4, it may then be determined whether more information has been requested in operation 410. For example, a user may select search filter options, such as the number or type (e.g., category) of search results. If more information has been requested, an additional search may be performed and resulting search results may be overlaid in an image/video that is returned to the mobile device in operations 404, 406, and 408. If the user selects filter criteria, the search may be performed or search results refined based on such filter criteria.

If additional information has not been requested, it may then be determined whether the encyclopedia mode has been selected in operation 412. If such mode has been selected, the procedure advances to an encyclopedia mode process (e.g., FIG. 3). It may also be determined whether an action mode has been selected in operation 414. If an action mode has been selected, the procedure continues to an action mode process (e.g., FIG. 5). Otherwise, it may be determined whether the user has exited the UAR service in operation 416. If the UAR has been exited, the UAR process ends. Otherwise, the decision support mode operation 214 may continue to repeat operation 410 through 416.

Figure 5:
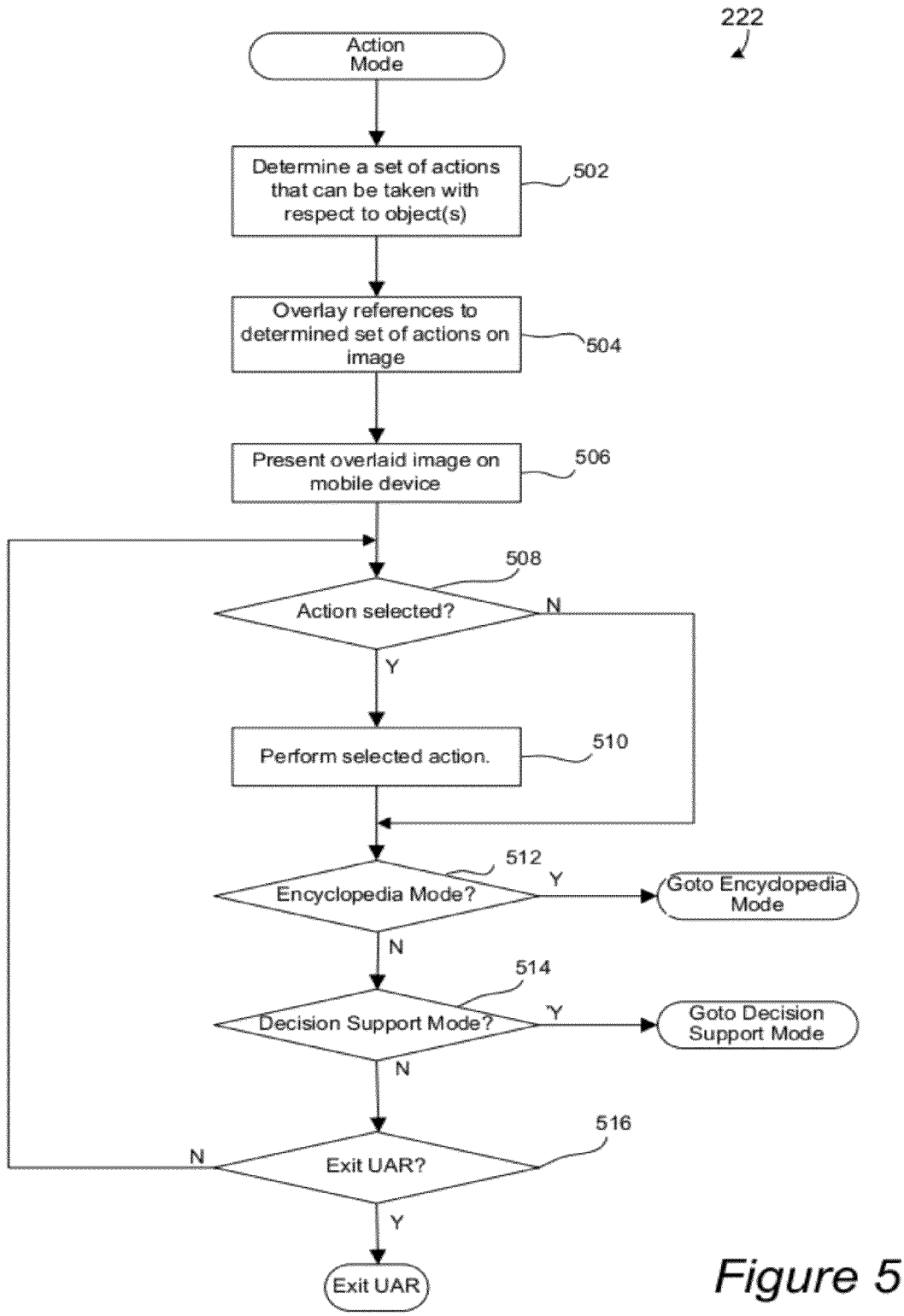
FIG. 5 is a flowchart illustrating the operation of FIG. 2 for performing an action mode in accordance with a specific embodiment of the present invention.

FIG. 5 is a flowchart illustrating the operation 222 of FIG. 2 for performing the action mode in accordance with a specific embodiment of the present invention. Initially, a set of actions that can be taken with respect to the identified objects may be determined in operation 502. Of course, a set of actions may have already been determined in a previous mode so that this operation can be skipped. References to such determined set of actions may then be overlaid on the image/video in operation 504. The overlaid image/video may then be presented on the mobile device in operation 506.

Figure 7F:
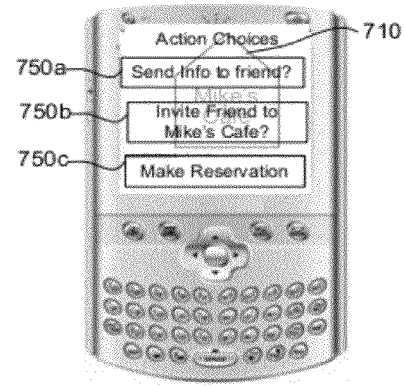
FIG. 7F shows references or links to selectable actions as they are presented over the original captured image/video of Mike's Café in the display of the mobile device of FIG. 7A in accordance with one embodiment of the present invention.

FIG. 7F shows references or links to selectable actions 750 as they are presented over the original captured image/video of Mike's Café 710 in accordance with one embodiment of the present invention. Of course, the action links 750 may replace the captured or previously displayed image/video of a different mode. As shown, the selectable action links include a "Send info to friend" option 750a, an "Invite friend to Mike's Café" option 750b, and a "Make reservation" option 750c.

It may then be determined whether an action has been selected in operation 508. If an action has been selected, the selected action may be performed in operation 510. Otherwise, this operation is skipped. Referring to the example of FIG. 7F, if the user selects the "Send info to a friend" option 750a, the user may then be presented with an interface for choosing a friend to send a live video stream of the contextual and/or decision support information that was obtained for the sending user. For instance, the user can select a mobile phone number to which to send a live video stream. If the user selects the "invite a friend" option 750b, the user may be presented with an interface for choosing to connect to another mobile device (e.g., enter and dial a mobile phone number of a friend). If the user selects the "make reservation" option 750c, the user is then allowed to select a reservation time. After the user enters a time, the UAR may then make the reservation and update the calendars of the user (as well as other users if indicated by the user).

As actions are selected by a user, input mechanisms for selecting other actions may also be presented to the user in relation to the selected action. For instance, if a user select an action to communicate with another user, an option for sending a live (or recorded) video to the other user may also be presented to the requesting user.

Another embodiment of the action mode includes presenting the user with instructional video, images, text, and/or urls related to recommendations related to actions that the user can take next. For instance, the user can select to receive instructional videos on how to eat Injera at an Ethiopian restaurant. The user can observe the video on the mobile device and proceed to eat the Injera, using the right way. The user can opt to forward this video, save it for future references, rate the video, and so on.

Referring back to FIG. 5, it may then be determined whether the encyclopedia mode has been selected in operation 512. If such mode has been selected, the procedure advances to an encyclopedia mode process (e.g., FIG. 3). It may also be determined whether a decision support mode has been selected in operation 514. If a decision support mode has been selected, the procedure continues to the decision support mode process (e.g., FIG. 4). Otherwise, it may be determined whether the user has exited the UAR service in operation 516. If the UAR has been exited, the UAR process ends. Otherwise, the action mode operation 218 may continue to repeat operations 508 through 516.

Any of the above described modes may be performed any number of times with respect to one or more identified objects in one or more scenes captured by a particular mobile device. Additionally, the specific location of the mobile device may be determined from the mobile device's GPS (global positioning satellite) device if present. The location information may then be used to facilitate identification of the imaged objects and/or determination of meta data for an identified object.

Figure 6:
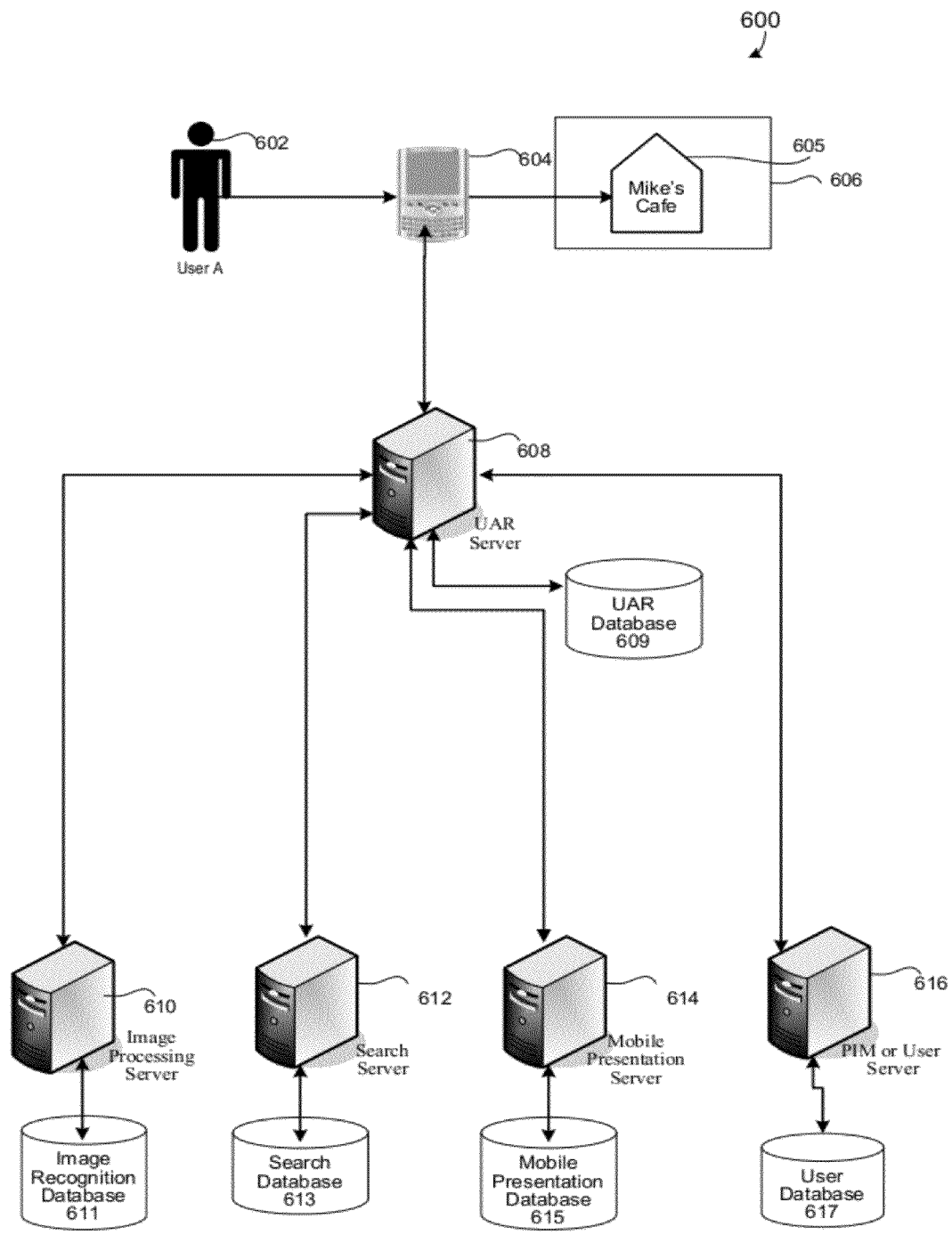
FIG. 6 is a diagrammatic representation of an example network for performing a UAR service for a specific user of mobile device in accordance with a specific implementation of the present invention.

A UAR application and/or service may be implemented for a specific mobile device user in any number of ways. FIG. 6 is a diagrammatic representation of an example network 600 for performing a UAR service for a specific user of mobile device 604 in accordance with a specific implementation of the present invention. As shown, user A (602) passes the camera of the mobile device 604, while running the mobile device's UAR application, over object 605. The camera captures an image/video 606 that includes the object 605. The mobile device 604 may send the image/video 606 to a UAR server 608.

The UAR server 406 may also send the captured image or video to an image recognition server 610. The image recognition server 610 may generally be configured to perform optical recognition of the captured image/video in order to identify objects in the received image/video, e.g., 606. In this specific example, the image/video 606 includes the restaurant "Mike's Café" 605. The data may also be captured in the image recognition database 611, and this recorded data may be used for later object recognition of a similar image/video and/or so as to be accessible by the user A (602). The image recognition database could also contain training object images/video having known identities.

Some techniques that may be used in image processing and object recognition analysis include but are not limited to: 1) generating a histogram that counts and graphs the total number of pixels at each grayscale level (A histogram may be used to detect underexposure or saturation in an image/video), 2) generating a line profile that plots the variations of intensity along a line (line profiles are sometime helpful in determining the boundaries between objects in an image/video), 3) performing intensity measurements to measure grayscale statistics in an image/video or a region of an image/video, such as but not limited to minimum intensity value, maximum intensity value, mean intensity value, standard deviation of the intensity value, 4) using look-up tables to convert grayscale values in the source image/video into other grayscale values in a transformed image/video, 5) using spatial filters to remove noise, smooth, sharpen or otherwise transform an image/video, such as but not limited to Gaussian filters for smoothing images/video, Laplacian filters for highlighting image/video detail, Median and nth order filters for noise removal and Prewitt, Roberts and Sobel filters for edge detection, 6) using grayscale morphology to filter or smooth the pixel intensities of an image/video, to alter the shape of regions by expanding bright areas at the expense of dark areas, remove or enhance isolated features, smooth gradually varying patterns and increase the contrast in boundary areas, 7) using frequency domain processing to remove unwanted frequency information, such as noise, 8) blob (binary large object) analysis in regards to touching pixels with same logic state (Blob analysis may be used to find statistical information such as the size of blobs or the number, location and presence of blob regions to locate particular objects in an image/video), 9) using thresholding to select ranges of pixel values in grayscale and color images/video that separate objects under consideration from the background, or 10) using binary morphological operations to extract and/or alter the structures of particles (e.g., blobs) in a binary image/video including primary binary morphology, advanced binary morphology.

Other techniques may include 11) using edge detection algorithms, 12) using gauging of dimensional characteristics of objects, 13) using image correlation to determine how close an image/video is to an expected image/video (e.g., comparing a newly captured image/video to a recorded image/video that has already been analyzed for object identification), 14) using pattern matching to locate regions of a grayscale image/video and determine how close the grayscale image/video matches a predetermined template (Pattern matching may be configured to find template matches regardless of poor lighting, blur, noise, shifting of the template or rotation of the template. For graphical components on a captured image/video, the size, shape, location, etc. that correspond to specific objects in an image/video may be predetermined which allows a template to be constructed for particular object sets), 15) using optical character recognition algorithms and methods, 16) using color matching to quantify which color, how much of each color and/or ratio of colors exist in a region of an image/video and compare the values generated during color matching to expected values to determine whether the image/video includes known reference object colors, and 17) using color pattern matching to locate known reference patterns in a color image/video.

Referring back to FIG. 6, identified objects that are extracted by the image recognition server 610 may also be sent to the search server 612. The search server 612 may be configured to perform searches based on the identified object or actions that can be taken with such identified object. Example searches may include a World Wide Web search to obtain information regarding the identified objects or corresponding possible actions, and any found information, along with the identified object or action, may then be stored in search database 613. This recorded data may be used for later searching with respect to a similar image/video and/or so as to be accessible by the user A (602). GPS data from the mobile device may also be sent to the search server 612, e.g., via the UAR server 608. The search server 612 may be configured to serve information regarding the identified one or more objects and/or location.

The search server may then send the search results back to the UAR server 608, which sends the search results to a mobile presentation server 614. The mobile presentation server 614 may also receive the captured image/video 606 from UAR server 608 and operate to overlay the search results over the captured image/video 606. The overlaid image/video may then be sent by the mobile presentation server 614 back to the UAR server 608, which then sends the overlaid image/video to user A's mobile device 604. The overlaid image/video may be presented on the mobile device's display. The overlaid image/video may also be recorded in mobile presentation database 615 for later retrieval by the UAR or by the user. The UAR may also have one or more UAR databases 609 for storing information for facilitating the various modes, e.g., storing associations between specific actions and object type, action references, decision support references, or any suitable information described herein. The UAR database 609 may also be used to record video streams, including imaged objects and meta data, to be re-experienced by a user or for other business reasons, e.g., advertising an establishment by using a particular video stream or image.

The UAR server 608 may also access information from a PIM or User server 616, e.g., from user database 617. This user information may be used in a search by search server 612, as well as for performance of actions by UAR server 608, such as updating PIM information of one or more users.

The UAR service may be configured to provide any conceivable type of meta data for images or video captured by a mobile device. For instance, one could walk through a store and point the camera at products and watch a video stream of pricing data scroll across the screen of the mobile device. The price data could be from the particular place at which the user is located, as well as from other places that carry the same product. The information may also include inventory and stocking information to the user. The UAR may also alert the user if the object she is viewing is at the lowest price available or whether there are lower prices available at other places or retailers.

In another embodiment, the camera can be pointed at a scene, and the UAR is configured to tell the user to take an action based on an intelligent analysis of the imaged scene. For example, if the user points the camera at a subway station platform, and the UAR recognizes a person on the platform as a wanted criminal, the UAR can advise the user to vacate the premises or call the police or the UAR could call the police on behalf of the user with the user's permission. In this embodiment, the image recognition server is configured to search criminal databases for matching faces.

In another embodiment, the mobile device may take the form of or include wearable glasses or goggles having a miniature camera which records images/video that are also seen by the user. The goggles or glasses may be configured to send the recorded images/video to a mobile device of the user via a wireless communication signal or the goggles may themselves include a mobile communication function, e.g., take the form of a camera enabled mobile communication device. The image/video is then sent to a UAR server as described above so as to obtain meta data as described above. The obtained meta data can then be displayed in a small screen of the goggles or glasses so as to be in the field of view of the user, overlaying the meta data over the viewed scene. For example, the goggle wearer can look at people while receiving and viewing an overlay of publicly available information regarding the viewed people and be used as a social networking, research, or work-related tool.

In an alternative embodiment, PIM information may be presented to the user in the mobile device display so that the user can view his/her own PIM information with respect to a particular scene. For instance, a user may view his/her financial information to help decide whether to purchase a particular imaged product. In another implementation, a user can view a map overlay to facilitate navigation through an unfamiliar scene. The display of the mobile device could present directions on how the user can proceed to a particular destination, and directions could continue to be updated until the user arrives at her destination.

Figure 8:
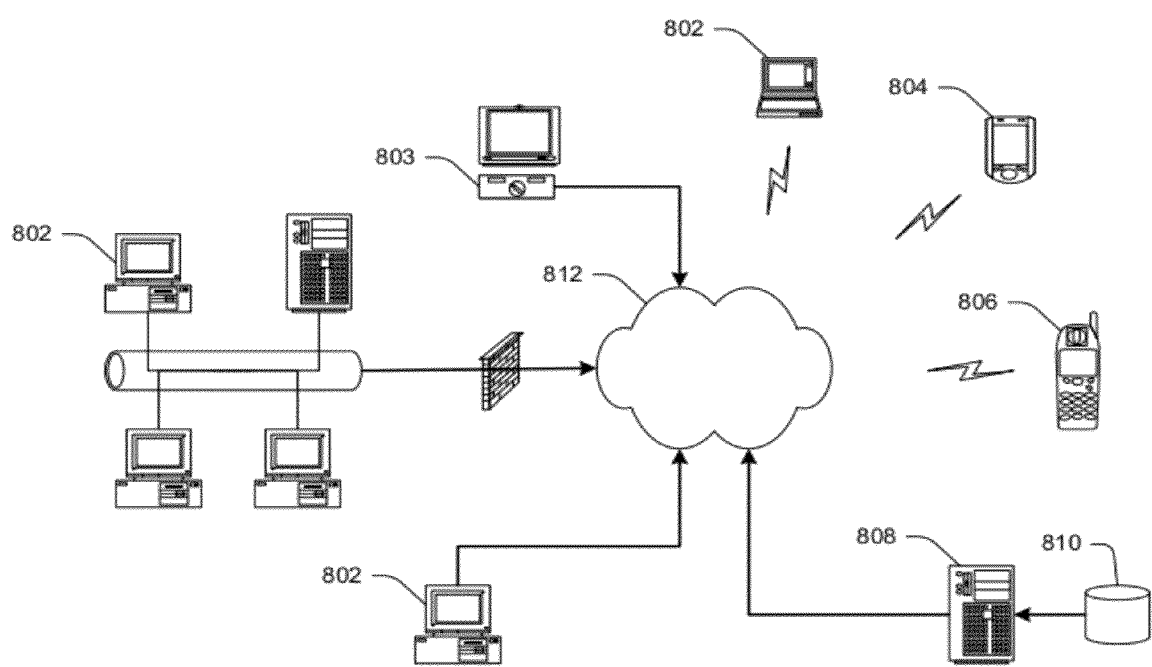
FIG. 8 is a simplified diagram of a network environment in which specific embodiments of the present invention may be implemented.

Embodiments for implementing and managing a UAR may be employed in a wide variety of diverse computing contexts. For example, as illustrated in FIG. 8, implementations are contemplated in which the relevant population of users interact with a diverse network environment via any type of computer (e.g., desktop, laptop, tablet, etc.) 802, media computing platforms 803 (e.g., cable and satellite set top boxes and digital video recorders), handheld computing devices (e.g., PDAs) 804, cell phones 406, or any other type of computing or communication platform.

And according to various embodiments, images/video and objects (to be identified) that are processed in accordance with the invention may be obtained using a wide variety of techniques. For example, a user's interaction with a local application, web site or web-based application or service (e.g., using a mobile device's camera or UAR functions) may be accomplished using any of a variety of well known mechanisms for recording a user's behavior. However, it should be understood that such methods of obtaining images/video are merely exemplary and that images/video may be collected in many other ways.

UAR management may be handled according to the invention in some centralized manner. This is represented in FIG. 8 by server 808 and data store 810 that, as will be understood, may correspond to multiple distributed devices and data stores (e.g., as shown in FIG. 6). The invention may also be practiced in a wide variety of network environments (represented by network 812) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Figure 9:
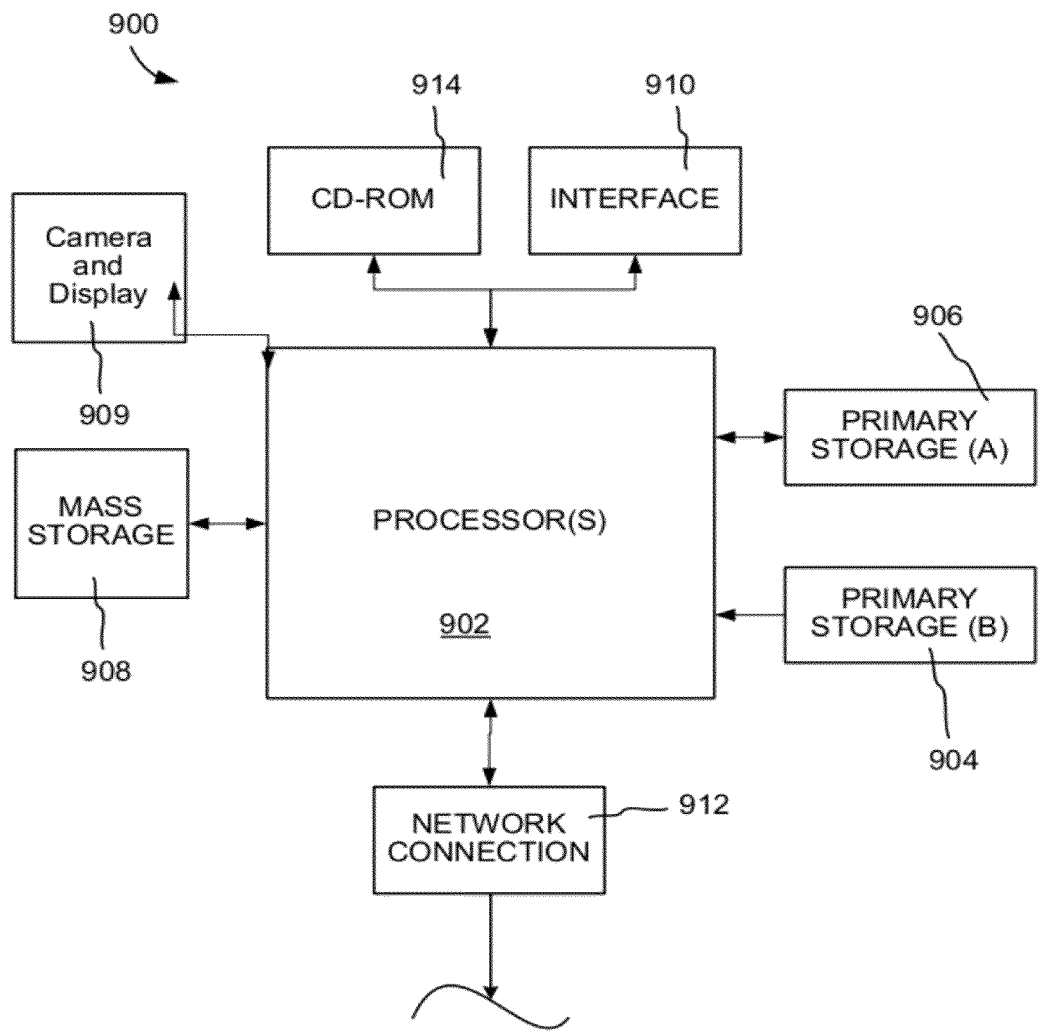
FIG. 9 illustrates a typical computer system that, when appropriately configured or designed, can serve as a system of this invention.

FIG. 9 illustrates a typical computer system that, when appropriately configured or designed, can serve as a UAR application or system of this invention. The computer system 900 includes any number of processors 902 (also referred to as central processing units, or CPUs) that are coupled to storage devices including primary storage 906 (typically a random access memory, or RAM), primary storage 904 (typically a read only memory, or ROM). CPU 902 may be of various types including microcontrollers and microprocessors such as programmable devices (e.g., CPLDs and FPGAs) and unprogrammable devices such as gate array ASICs or general purpose microprocessors. As is well known in the art, primary storage 904 acts to transfer data and instructions uni-directionally to the CPU and primary storage 906 is used typically to transfer data and instructions in a bi-directional manner. Both of these primary storage devices may include any suitable computer-readable media such as those described herein. A mass storage device 908 is also coupled bi-directionally to CPU 902 and provides additional data storage capacity and may include any of the computer-readable media described above. Mass storage device 908 may be used to store programs, data and the like and is typically a secondary storage medium such as a hard disk. It will be appreciated that the information retained within the mass storage device 908, may, in appropriate cases, be incorporated in standard fashion as part of primary storage 906 as virtual memory. A specific mass storage device such as a CD-ROM 914 may also pass data uni-directionally to the CPU.

CPU 902 is also coupled to an interface 910 that connects to one or more input/output devices such as such as video monitors, track balls, mice, keyboards, microphones, speakers, touch-sensitive displays, transducer card readers, magnetic or paper tape readers, tablets, styluses, voice or handwriting recognizers, or other well-known input devices such as, of course, other computers. The CPU 902 may also be coupled with a display and camera 909, e.g., of a camera enabled mobile device. Finally, CPU 902 optionally may be coupled to an external device such as a database or a computer or telecommunications network using an external connection as shown generally at 912. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store images/video, location information, object identities, search results, contextual information, action references, decision support references, user profile, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as air, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method of providing information regarding one or more scenes captured with a camera of a mobile device, comprising:
   in response to determining that a camera of the mobile device is pointed at a scene including one or more objects, (i) displaying a visual representation of the scene in a display of the mobile device, and (ii) presenting in combination with the visual representation a plurality of options for selecting one of a plurality of user augmented reality modes that include an encyclopedia mode, a decision support mode, and an action mode;
   in response to selection of the decision support mode, obtaining decision information related to a set of actions that can be taken with respect to an identity of the one or more objects and presenting the decision information in the display; and
   in response to selection of the action mode after selection of the decision support mode, obtaining a set of references to the set of actions related to the presented decision information and that can be performed with respect to the identity of the one or more objects, and presenting the set of references in the display so that the references are selectable by a user to initiate the referenced actions, wherein the referenced actions include sending information regarding the one or more objects to another user using a contact list on the mobile device, or making a reservation at a place associated with the one or more objects including creating an event in a calendar on the mobile device.

2. The method as recited in claim 1, further comprising: if the encyclopedia mode is selected while the mobile device is in decision support mode or action mode, switching to the encyclopedia mode by obtaining contextual information regarding an identity of the one or more objects and presenting the obtained contextual information in the display, wherein obtaining the contextual information, decision information, and set of references to actions is accomplished by sending the visual representation to one or more servers and receiving a second visual representation from the one or more servers whereby the second visual representation includes the contextual information, decision information, or the set of references, respectively, and wherein presenting the contextual information, decision information, and set of references comprises presenting the received second visual representation.

3. The method as recited in claim 2, wherein the contextual information, decision information, or the set of references is overlaid on the captured scene.

4. The method as recited in claim 2, further comprising:
determining an identity of each of the one or more objects by processing the visual representation of the scene using an object recognition technique; and
sending the determined identity for each of the one or more objects and a location of the mobile device to the one or more servers and wherein the contextual information, decision information, and set of references are based on the determined identity for each of the one or more objects and the location of the mobile device.

5. The method as recited in claim 4, wherein the contextual information, decision information, and set of references are further based on a social network of the user associated with the mobile device.

6. The method as recited in claim 4, wherein the contextual information, decision information, and set of references are further based on an indication as to a direction in which the camera is pointed with respect to a physical location of such camera.

7. The method as recited in claim 2, wherein
the contextual information includes one or more of the following items: historical information regarding a place in the scene, historical information regarding a building in the scene, time period information regarding other businesses that were located at a place or in a building of the scene, weather information for a place in the scene, travel direction information for a place or building in the scene, one or more reviews, rating, or commentary for at least one object of the scene, a dress requirement of a restaurant or event of the scene, a menu from a restaurant in the scene, a price list for a business in the scene, hours of operation for a place in the scene, information regarding a person in the scene, a link to a personal web site of a person in the scene, contact information for a person in the scene, biographical information for a person in the scene, membership information for a person in the scene, or information regarding a direction of the scene with respect to a street or a transportation route in the scene;
the decision information includes one or more of the following items: one or more reviews, rating, or commentary by a professional critic or friend in the user's social network for at least one object of the scene, a dress requirement of a restaurant of the scene, a menu from a restaurant in the scene, a price list for a business in the scene, hours of operation for a place in the scene, or a count of people or friends of the user who have visited a place in the scene; and
the actions further include one or more of the following: communicating with a particular person via such other person's communication device using the contact list on the mobile device or sending a video stream of one or more scene images/video captured with the user's mobile device such that the sent video stream also includes the contextual information or the decision information for such one or more scene images/video.

8. The method as recited in claim 1, further comprising when a reference is selected by the user, initiating the referenced action.

9. The method as recited in claim 8, further comprising obtaining and presenting additional contextual and/or decision information after the reference is selected by the user.

10. A mobile device for providing information regarding one or more scenes, comprising:
a camera for capturing one or more scenes;
a display;
at least one a processor; and
at least one memory, the at least one processor and/or memory being configured for:
in response to determining that the camera is pointed at a scene including one or more objects, (i) displaying a visual representation of the scene in the display, and (ii) presenting in combination with the visual representation a plurality of options for selecting one of a plurality of user augmented reality modes that include an encyclopedia mode, a decision support mode, and an action mode;
in response to selection of the decision support mode, obtaining decision information related to a set of actions that can be taken with respect to an identity of the one or more objects and presenting the decision information in the display; and
in response to selection of the action mode after selection of the decision support mode, obtaining a set of references to the set of actions related to the presented decision information and that can be performed with respect to the identity of the one or more objects, and presenting the set of references in the display so that the references are selectable by a user to initiate the referenced actions, wherein the referenced actions include sending information regarding the one or more objects to another user using a contact list on the mobile device, or making a reservation at a place associated with the one or more objects including creating an event in a calendar on the mobile device.

11. The mobile device as recited in claim 10, the at least one processor and/or memory being configured for if the encyclopedia mode is selected while the mobile device is in decision support mode or action mode, switching to the encyclopedia mode by obtaining contextual information regarding an identity of the one or more objects and presenting the obtained contextual information in the display, wherein obtaining the contextual information, decision information, and set of references to actions is accomplished by sending the visual representation to one or more servers and receiving a second visual representation from the one or more servers whereby the second visual representation includes the contextual information, decision information, or the set of references, respectively, and wherein presenting the contextual information, decision information, and set of references comprises presenting the received second visual representation.

12. The mobile device as recited in claim 11, wherein the second visual representation is overlaid on the captured scene.

13. The mobile device as recited in claim 11, the at least one processor and/or memory being configured for:
determining an identity of each of the one or more objects by processing the visual representation of the scene using an object recognition technique; and sending the determined identity for each of the one or more objects and a location of the mobile device to the one or more servers and wherein the contextual information, decision information, and set of references are based on the determined identity for each of the one or more objects and the location of the mobile device.

14. The mobile device as recited in claim 13, wherein the contextual information, decision information, and set of references are further based on a social network of the user associated with the mobile device.

15. The mobile device as recited in claim 13, wherein the contextual information, decision information, and set of references are further based on an indication as to a direction in which the camera is pointed with respect to a physical location of such camera.

16. At least one computer readable storage medium that is non-transitory and having computer program instructions stored thereon that are arranged such that when executed by one or more computing devices they cause the one or more computing devices to perform the following operations:
  in response to determining that a camera of the mobile device is pointed at a scene including one or more objects, (i) displaying a visual representation of the scene in a display of the mobile device, and (ii) presenting in combination with the visual representation a plurality of options for selecting one of a plurality of user augmented reality modes that include an encyclopedia mode, a decision support mode, and an action mode;
  in response to selection of the decision support mode, obtaining decision information related to a set of actions that can be taken with respect to an identity of the one or more objects and presenting the decision information in the display; and
  in response to selection of the action mode after selection of the decision support mode, obtaining a set of references to the set of actions related to the presented decision information and that can be performed with respect to the identity of the one or more objects, and presenting the set of references in the display so that the references are selectable by a user to initiate the referenced actions, wherein the referenced actions include sending information regarding the one or more objects to another user using a contact list on the mobile device, or making a reservation at a place associated with the one or more objects including creating an event in a calendar on the mobile device.

17. The at least one computer readable storage medium as recited in claim 16, wherein the computer program instructions are further configured for if the encyclopedia mode is selected while the mobile device is in decision support mode or action mode, switching to the encyclopedia mode by obtaining contextual information regarding an identity of the one or more objects and presenting the obtained contextual information in the display, wherein obtaining the contextual information, decision information, and set of references to actions is accomplished by sending the visual representation to one or more servers and receiving a second visual representation from the one or more servers whereby the second visual representation includes the contextual information, decision information, or the set of references, respectively, and wherein presenting the contextual information, decision information, and set of references comprises presenting the received second visual representation, and wherein the second visual representation is overlaid on the captured scene.

18. The at least one computer readable storage medium as recited in claim 17, wherein the contextual information includes one or more of the following items: historical information regarding a place in the scene, historical information regarding a building in the scene, time period information regarding other businesses that were located at a place or in a building of the scene, weather information for a place in the scene, travel direction information for a place or building in the scene, one or more reviews, rating, or commentary for at least one object of the scene, a dress requirement of a restaurant or event of the scene, a menu from a restaurant in the scene, a price list for a business in the scene, hours of operation for a place in the scene, information regarding a person in the scene, a link to a personal web site of a person in the scene, contact information for a person in the scene, biographical information for a person in the scene, membership information for a person in the scene, or information regarding a direction of the scene with respect to a street or a transportation route in the scene;
  the decision information includes one or more of the following items: one or more reviews, rating, or commentary by a professional critic or friend in the user's social network for at least one object of the scene, a dress requirement of a restaurant of the scene, a menu from a restaurant in the scene, a price list for a business in the scene, hours of operation for a place in the scene, or a count of people or friends of the user who have visited a place in the scene; and
  the actions further include one or more of the following: communicating with a particular person via such other person's communication device using the contact list on the mobile device or sending a video stream of one or more scene images/video captured with the user's mobile device such that the sent video stream also includes the contextual information or the decision information for such one or more scene images/video.

19. The at least one computer readable storage medium as recited in claim 16, wherein the computer program instructions are further arranged to initiate the referenced action when a reference is selected by the user.

20. The at least one computer readable storage medium as recited in claim 19, wherein the computer program instructions are further arranged to present additional contextual and/or decision information, after the reference is selected by the user.

21. The at least one computer readable storage medium as recited in claim 16, wherein the computer program instructions are further configured for:
  determining an identity of each of the one or more objects by processing the visual representation of the scene using an object recognition technique; and
  sending the determined identity for each of the one or more objects and a location of the mobile device to the one or more servers and wherein the contextual information, decision information, and set of references are based on the determined identity for each of the one or more objects and the location of the mobile device.

* * * * *